United States Patent [19]

Herzan et al.

[11] 4,222,411
[45] Sep. 16, 1980

[54] LEVER ACTUATED FLUID COUPLING

[75] Inventors: Eugene H. Herzan, Minnetonka; Lyle R. Johnson, Minneapolis, both of Minn.

[73] Assignee: Parker-Hannifin Corporation, Cleveland, Ohio

[21] Appl. No.: 4,776

[22] Filed: Jan. 19, 1979

[51] Int. Cl.³ ........................ F16L 37/28; F16L 29/00
[52] U.S. Cl. .......................... 137/614.04; 137/614.06; 251/149.9
[58] Field of Search .............. 137/614, 614.01, 614.02, 137/614.03, 614.04, 614.05, 614.06; 251/149.1, 149.6, 149.7, 149.8, 149.9

[56] References Cited

U.S. PATENT DOCUMENTS

| 3,348,575 | 10/1967 | Simak | 137/614.05 |
|---|---|---|---|
| 3,498,324 | 3/1970 | Breuning | 137/614.04 |
| 3,570,543 | 3/1971 | Ekman | 137/614.04 X |
| 3,680,591 | 8/1972 | Vik | 137/614.05 |
| 3,710,823 | 1/1973 | Vik | 137/614.06 X |
| 3,730,221 | 5/1973 | Vik | 137/614 |
| 4,009,729 | 3/1977 | Vik | 137/614.05 |
| 4,074,698 | 2/1978 | Hobson et al. | 137/614.06 |
| 4,124,228 | 10/1978 | Morrison | 137/614.03 X |

Primary Examiner—Alan Cohan
Assistant Examiner—A. Michael Chambers
Attorney, Agent, or Firm—James A. Baker

[57] ABSTRACT

A manually actuated coupler hydraulically connects large diameter high pressure conduits while the conduits are pressurized. One of the conduits is provided with a body 11, a sleeve 12, and a lever 13 for effecting relative movement between the body and the sleeve. The other conduit is provided with a nipple 14. When the nipple and body are initially connected, they cooperatively define a chamber 43 which is hydraulically isolated from both conduits. The lever is then rotated to advance the sleeve toward the nipple and to open poppet valves 33, 34 in the sleeve and nipple to hydraulically connect the conduits through the chamber 43. The sleeve includes a pressure balancing area 48 which is in open fluid pressure communication with the chamber 43 under conditions, so that high fluid pressure from either conduit will pressure balance the sleeve.

4 Claims, 2 Drawing Figures

LEVER ACTUATED FLUID COUPLING

BACKGROUND OF THE INVENTION

The present invention relates generally to fluid couplers, and more particularly to lever actuated couplers for releasably connecting high pressure large diameter conduits when either or both conduits are pressurized.

Prior art couplers for this purpose include a valved body on one of the conduits and a valved nipple on the other conduit. When the body and nipple are disconnected, the valve in each is closed to prevent loss of fluid from the conduits. When the nipple is connected to the body, it is necessary to open the valves. For this purpose, a handle or lever is usually provided on the body, and rotation of the lever effects relative movement between a valve assembly and the body to open both of the valves. When the pressures in the conduits are high and the diameters of the conduits are large (that is, pressures in excess of 1,000 pounds per square inch and conduits having an inside diameter of one-half inch or larger), the force required to effect the relative movement between the valve assembly and the body can be so large that manual actuation of the valve is not possible or practical.

Prior art lever actuated couplings which include a valved body and a valved nipple are shown in U.S. Pat. Nos. 3,680,591; 4,009,729, 3,710,823; and 4,074,698. A prior art coupler having a valved body and a valved nipple in which the valves are opened by the application of fluid pressure is shown in U.S. Pat. No. 3,730,221.

SUMMARY OF THE INVENTION

The present invention provides a lever actuated coupler in which the force required to turn the lever is not excessive, even for large diameter high pressure applications.

The coupler includes a body secured to one conduit and a nipple secured to another conduit. The body is provided with a poppet valve assembly carried by a sleeve and a lever for effecting relative movement between the body and the sleeve. The sleeve includes an annular balancing area, and the balancing area and the body cooperatively define a variable volume balancing chamber. The nipple also includes a poppet valve assembly.

When the body and nipple are disconnected, the popet valve assembly in each is closed to prevent loss of fluid from the conduits. When the nipple and body are initially connected, the poppet valve assemblies cooperatively define an intermediate chamber, and the poppets remain closed to hydraulically isolate the intermediate chamber from the fluid pressure in the conduits. A passage in the sleeve maintains open fluid pressure communication between the intermediate chamber and the balancing chamber so that, under this condition, the balancing area of the sleeve is subjected only to the air pressure in the intermediate chamber.

When the lever is rotated and the poppet valve assemblies begin to open, high fluid pressure from either or both conduits is communicated to the intermediate chamber. This increased pressure acts against one end of the sleeve to resist turning the lever, but this force is essentially balanced by an opposing force on the sleeve due to fluid pressure in the intermediate chamber acting against the balancing area. As the sleeve continues to advanced relative to the body, the volume of the balancing chamber increases, and this volume is filled with fluid from the intermediate chamber.

When the poppet valve assemblies of the body and nipple are to be closed prior to disconnecting the nipple from the body, the lever is turned to retract the sleeve. This diminishes the volume in the balancing chamber, and fluid from the balancing chamber is free to flow through the passage back to the intermediate chamber so that such fluid does not have to be returned by a separate line to a reservoir.

BRIEF DESCRIPTION OF THE DRAWINGS

These and other aspects and advantages of the invention are provided by the preferred embodiment of the invention shown in the accompanying drawings, wherein.

DETAILED DESCRIPTION OF THE DRAWING

Figure 1:
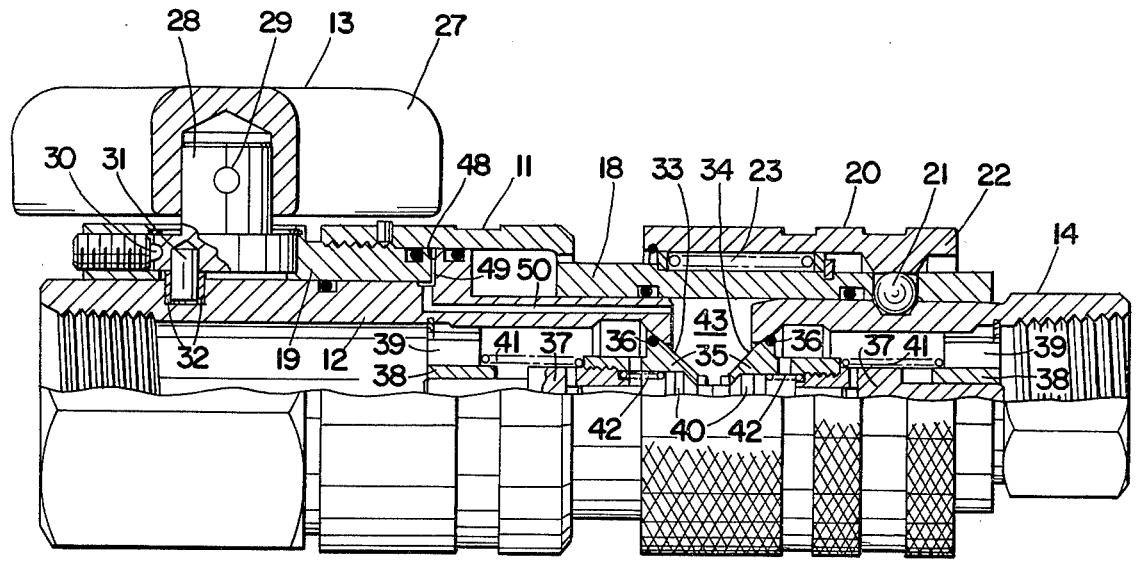
FIG. 1 is a cross-sectional side elevational view of the coupler, with the body valve and the nipple valve both closed.

Referring now to the drawings greater detail, FIG. 1 shows a coupler which includes a body 11, a sleeve 12, a lever device 13, and a nipple 14.

The body 11 includes a cylindrical main body portion 18 and an end portion 19 threadably secured to the main body portion 18 and secured in place by a suitable set screw. The forward end of the main body portion 18 carries a locking device 20 for releasably retaining the nipple 14 on the body 11. The locking device 20, in a well known manner, includes a plurality of locking balls 21 each of which is received in a radial hole in the main body portion 18. A locking sleeve 22 holds the balls 21 in the radially inward position shown in FIG. 1 to retain the nipple 14 on the body 11. Movement of the locking sleeve 22 in either direction against the action of the spring 23 permits the balls to move radially outwardly to release the nipple 14 from the body 11.

The lower device 13 includes a handle or lever 27 which is secured to an axle 28 by a pin 29. The axle 28 is received in a suitable radial opening in the end portion 19 and is held in place by a snap ring so that the axle 28 can be rotated by the lever 27. A spring loaded detent 30 cooperates with suitable shallow recesses in the axle 28 to hold the axle 29 in the closed position shown in FIG. 1 or in the open position shown in FIG. 2. A pin 31 is received in a hole in the axle 28 and projects inwardly into an annular groove in the sleeve 12. Annular washer bearings 32 are disposed on each side of the groove to reduce friction and excessive wear between the annular groove of the sleeve 12 and the pin 31.

The sleeve 12 carries a body valve assembly 33, and the nipple 14 carries a nipple valve assembly 34. The valve assemblies each include a main poppet 35 which carries an annular seal 36. The main poppets 35 are each threadably fastened to a cylindrical carrier 37, and the carriers 37 are each slidably received in an annular bearing 38. The bearings 38 are each secured in place by integrally formed spokes 39 which extend radially outwardly and are secured in place by a suitable snap ring.

The valve assemblies 33 and 34 each also include a pilot poppet 40 which is slidably received in one end of the carrier 37 and which seals against a mating sealing surface on the main poppet 35. The main poppets 35 are each spring biased to a normally closed position by a spring 41, and the pilot poppets 40 are each normally biased to a closed position by a spring 42.

The valve assemblies 33 and 34 cooperatively define an intermediate chamber 43 therebetween. The outlet end of the sleeve 12 has a lateral cross-sectional area exposed to pressure in the intermediate chamber 43. If the pressure in the intermediate chamber 43 is relatively high (that is, in excess of 1,000 pounds per square inch), such pressure acting against the outlet end of the sleeve 12 will present a substantial force urging the sleeve 12 to the left away from the nipple 14.

The sleeve 12 is also provided with an annular balancing area 48. The balancing area 48 faces toward the inlet end of the sleeve 12 and is arranged so that fluid pressure acting against the balancing area 48 urges the sleeve 12 to the right toward the nipple 14. The balancing area 48 of the sleeve 12 and the body 11 cooperatively define a variable volume balancing chamber 49. A passage 50 extends radially and axially through the sleeve 12 and maintains open fluid pressure communication between the balancing chamber 49 and the intermediate chamber 43 when the valve assemblies 33 and 34 are closed and under all other operating conditions.

Turning now to the operation of the coupler shown in the drawings, the inlet end of the sleeve 12 is threadably connected to a first conduit (not shown), while the outlet end of the nipple 14 is threadably connected to a second conduit (not shown). Although the terms "inlet" and "outlet" are used for clarity, fluid can flow in either direction through the coupling, and the coupling is frequently used in association with a second identical coupling so that the fluid flows in one direction through one of the couplings to supply fluid pressure and fluid flows in the other direction through the other coupling to return the fluid.

When the body 11 and nipple 14 are disconnected, the lever device 13 is in the closed position shown in FIG. 1 so that the sleeve 12 is in a retracted position. The nipple 14 is then inserted into the outlet end of the body 11 and held in place by the locking balls 21. With the coupling initially assembled in this manner, fluid pressure can be present in the first conduit or in the second conduit or in both conduits. However, because the body valve assembly 33 and the nipple valve assembly 34 are both closed, the intermediate chamber 43 contains only air under relatively low pressure. Under this condition, the passage 50 maintains the balancing chamber 49 at the same pressure level as the intermediate chamber 43.

When it is desired to open the body valve assembly 33 and the nipple valve assembly 34, the lever 27 is rotated to turn the axle 28 and pin 31. This begins to axially advance the sleeve 12 toward the nipple 14. This initial movement is resisted by seal friction, by the springs 42, and by the fluid pressure within the sleeve 12 and within the nipple 14 acting against the backsides of the relatively small pilot poppets 40. When the pilot poppets 40 open, the fluid pressure from the sleeve 12 and from the nipple 14 is communicated to the intermediate chamber 43. This pressure in the intermediate chamber 43 acting against the right end of the sleeve 12 resists continued rightward movement of the sleeve 12. However, this resisting force is essentially balanced by the fluid pressure in the balancing chamber 49 which is equal to the fluid pressure in the intermediate chamber 43, so that excessive turning moments on the lever 27 are not required to continue the advancing movement of the sleeve 12 to the right. After the pilot poppets 40 open, the main poppets 35 engage and open also. During this advancing movement, the volume in the balancing chamber 49 increases, and this increasing volume is filled by fluid from the intermediate chamber 43. When the lever 27 has been rotated a full 180°, the coupling is in its fully opened position shown in FIG. 2. In this position, fluid can flow freely in either direction through the coupling.

Figure 2:
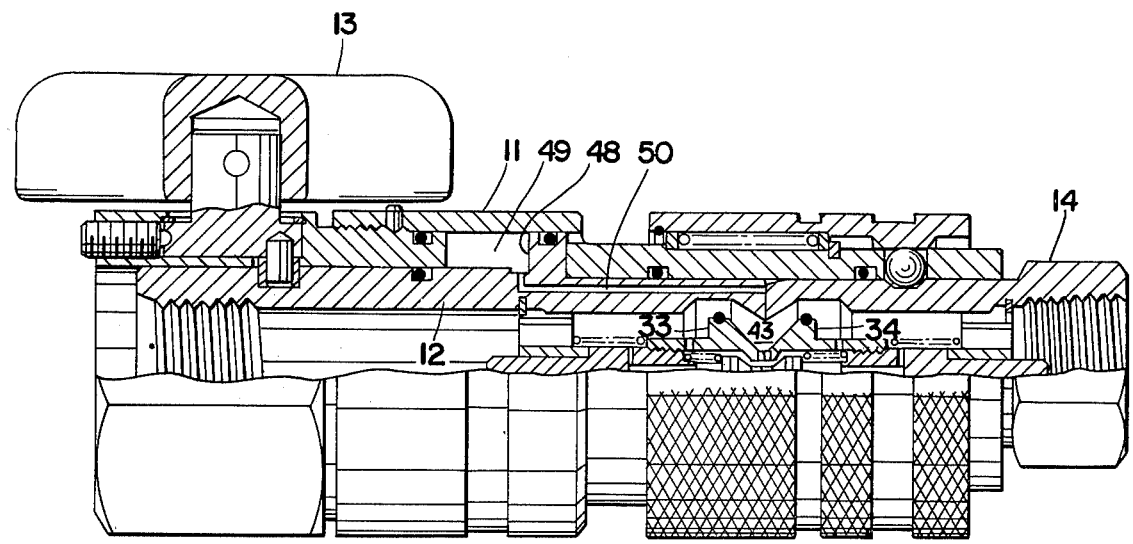
FIG. 2 is a view like FIG. 1 but showing body valve and the nipple valve in the open position.

When it is desired to disconnect the coupling, the lever 27 is rotated from its fully opened position shown in FIG. 2. This causes the pin 31 to push the sleeve 12 to the left away from the nipple 14. During this leftward movement of the sleeve 12, the volume of the balancing chamber 49 decreases and the fluid from the balancing chamber 49 flows through the passage 50 back to the intermediate chamber 43. Continued leftward movement of the sleeve 12 causes the main poppets 35 to close first, and then causes the pilot poppets 40 to close until the fully closed position shown in FIG. 1 is reached. The intermediate chamber 43 is thereby isolated from the fluid pressure in the conduit that is connected to the sleeve 12 and from the pressure in the conduit that is connected to the nipple 14. The nipple 14 is then disconnected by effecting relative movement between the main body portion 18 and the locking sleeve 22 to permit the locking balls 21 to move radially outwardly and release the nipple 14.

What is claimed is:

1. A coupler comprising a female number including a body, a sleeve, cam means extending between the body and said sleeve, said cam means being the sole means for controlling and effecting relative axial movement between said body and said sleeve, said sleeve having an axially inner end and an axially outer end, body valve means carried by said sleeve and movable by operation of said cam means between a fully open position hydraulically connecting said ends and a fully closed position hydraulically isolating said ends, a male member including a nipple portion capable of being coupled to said female member near said inner end, said nipple having nipple valve means movable for operation of said cam means between a fully open position and a fully closed position, locking means holding said nipple portion on said body and preventing relative axial movement between said nipple portion and said body when said body valve means is moved between said fully closed position and said fully open position by operation of said cam means, said nipple valve means and said body valve means defining an intermediate chamber when said members are coupled, said inner end of said sleeve having a transverse area facing in a direction toward said nipple portion and being exposed to the pressure in said intermediate chamber, surface means operatively connected to said sleeve and having a transverse area facing in a direction away from said nipple, portion said body having a cylindrical surface said surface means and said cylindrical surface defining an expansible chamber, means hydraulically connecting said expansible chamber and said intermediate chamber when said body valve means and said nipple valve means are both in said fully closed positions and conveying fluid under pressure from said intermediate chamber to said expansible chamber when said body valve means and said nipple valve means are both moved between said fully closed positions and said fully open positions by operation of said cam means said fluid under pressure in said expansible chamber biasing said sleeve toward said nipple portion.

2. A coupler according to claim 1, wherein said body valve means includes a main poppet and a pilot poppet each having a transverse area exposed to pressure in said intermediate chamber, said pilot poppet area being substantially smaller than said main poppet area, and said pilot poppet being constructed and arranged to open before said main poppet during movement of said sleeve while said main poppet is closed.

3. A coupler as set forth in claim 1, wherein said hydraulic connecting means includes a passage extending through said sleeve, and said surface means includes an annular portion on the exterior periphery of said sleeve.

4. A coupler as set forth in claim 3, wherein said passage is the sole means of hydraulically communicating with said expansible chamber.

* * * * *

UNITED STATES PATENT AND TRADEMARK OFFICE
CERTIFICATE OF CORRECTION

PATENT NO. : 4,222,411

DATED : September 16, 1980

INVENTOR(S) : Eugene H. Herzan and Lyle R. Johnson

It is certified that error appears in the above-identified patent and that said Letters Patent are hereby corrected as shown below:

In column 4, line 29, change "number" to ---member---

In column 4, line 30, change "the" to ---said---

In column 4, line 40, add ---portion--- after "said nipple"

In column 4, line 41, change "for" to ---by---

In column 4, line 55, delete the comma after "nipple"

In column 4, line 56, add a comma after "portion"

In column 4, line 56, add a comma after "surface"

Signed and Sealed this

Twenty-fifth Day of November 1980

[SEAL]

Attest:

SIDNEY A. DIAMOND

Attesting Officer

Commissioner of Patents and Trademarks